(12) United States Patent
Liu et al.

(10) Patent No.: US 10,232,574 B2
(45) Date of Patent: Mar. 19, 2019

(54) REUSABLE LENS MOLDS AND METHODS OF USE THEREOF

(71) Applicant: Novartis AG, Basel (CH)

(72) Inventors: Alice Weimin Liu, Alpharetta, GA (US); Burkhard Dietrich, Monheim (DE)

(73) Assignee: NOVARTIS AG, Basel (CH)

( * ) Notice: Subject to any disclaimer, the term of this patent is extended or adjusted under 35 U.S.C. 154(b) by 191 days.

(21) Appl. No.: 14/970,820

(22) Filed: Dec. 16, 2015

(65) Prior Publication Data

US 2016/0176133 A1   Jun. 23, 2016

Related U.S. Application Data

(60) Provisional application No. 62/092,902, filed on Dec. 17, 2014.

(51) Int. Cl.
*B29D 11/00* (2006.01)
*B29C 33/38* (2006.01)

(52) U.S. Cl.
CPC ........ *B29D 11/00519* (2013.01); *B29C 33/38* (2013.01); *B29D 11/00038* (2013.01);
(Continued)

(58) Field of Classification Search
CPC ........ B29D 11/00519; B29D 11/00038; B29D 11/00125; B29D 11/00134; B29D 11/05; B29C 33/38; B29C 35/0888
See application file for complete search history.

(56) References Cited

U.S. PATENT DOCUMENTS

| 3,723,144 A | 3/1973 | Flannery |
| 4,526,603 A | 7/1985 | Lehman |

(Continued)

FOREIGN PATENT DOCUMENTS

| EP | 0331483 A2 | 9/1989 |
| EP | 0835848 A2 | 4/1998 |

(Continued)

OTHER PUBLICATIONS

PCT International Search Report dated Mar. 9, 2016, International Application No. PCT/US2015/065999, International Filing Date Dec. 16, 2015.

(Continued)

*Primary Examiner* — Mathieu D Vargot
(74) *Attorney, Agent, or Firm* — Sheng-Hsin Hu

(57) ABSTRACT

The present invention general related to a reusable mold and a method of using the mold to manufacture contact lenses. The mold comprises a first mold half having a first mold surface in contact with a lens forming composition and a second mold half having a second mold surface in contact with the lens forming composition, wherein the first mold half and the second mold half are configured to receive each other such that a cavity is formed between the first mold surface and the second mold surface, wherein the cavity defines the shape of a contact lens to be molded, wherein the lens forming composition is polymerizable and/or crosslinkable by an actinic radiation, wherein at least one of the mold halves is a precision press molded mold made from an oxide glass selected from a group consisting of borosilicates glass and fluorophosphates glass.

15 Claims, 2 Drawing Sheets

(52) U.S. Cl.
CPC .... *B29D 11/00125* (2013.01); *B29K 2909/08* (2013.01); *B29K 2995/005* (2013.01); *B29K 2995/0027* (2013.01)

(56) References Cited

U.S. PATENT DOCUMENTS

| | | | |
|---|---|---|---|
| 4,819,039 | A | 4/1989 | Chi |
| 4,870,034 | A | 9/1989 | Kiefer |
| 4,898,777 | A | 2/1990 | Kindler |
| 5,147,435 | A | 9/1992 | Kubota |
| 5,508,317 | A | 4/1996 | Müller |
| 5,583,163 | A | 12/1996 | Müller |
| 5,629,246 | A | 5/1997 | Iyer |
| 5,789,464 | A | 8/1998 | Müller |
| 5,849,810 | A | 12/1998 | Müller |
| 5,958,809 | A | 9/1999 | Fujiwara |
| 6,627,124 | B1 | 9/2003 | Herbrechtsmeier et al. |
| 6,800,225 | B1 | 10/2004 | Hagmann |
| 6,807,823 | B2 | 10/2004 | Ohga |
| 7,384,590 | B2 | 6/2008 | Kelly |
| 7,387,759 | B2 | 6/2008 | Kelly |
| 7,618,909 | B2 | 11/2009 | Fujiwara |
| 7,799,714 | B2 | 9/2010 | Fujiwara |
| 8,163,206 | B2 | 4/2012 | Chang et al. |
| 8,349,749 | B2 | 1/2013 | Fujiwara |
| 2003/0087746 | A1 | 5/2003 | Ritter |
| 2004/0207105 | A1 | 10/2004 | Altmann |
| 2005/0204776 | A1 | 9/2005 | Hayashi |
| 2007/0060464 | A1* | 3/2007 | Ikenishi .............. C03B 7/12 501/48 |
| 2009/0247387 | A1 | 10/2009 | Ikenishi |
| 2011/0304064 | A1* | 12/2011 | Taguchi .............. C03B 23/0026 264/2.5 |

FOREIGN PATENT DOCUMENTS

| | | |
|---|---|---|
| JP | 61106211 A2 | 5/1986 |
| JP | 2000326347 A2 | 11/2000 |

OTHER PUBLICATIONS

PCT Written Opinion of the International Searching Authority dated Mar. 9, 2016, International Application No. PCT/US2015/065999, International Filing Date Dec. 16, 2015.

\* cited by examiner

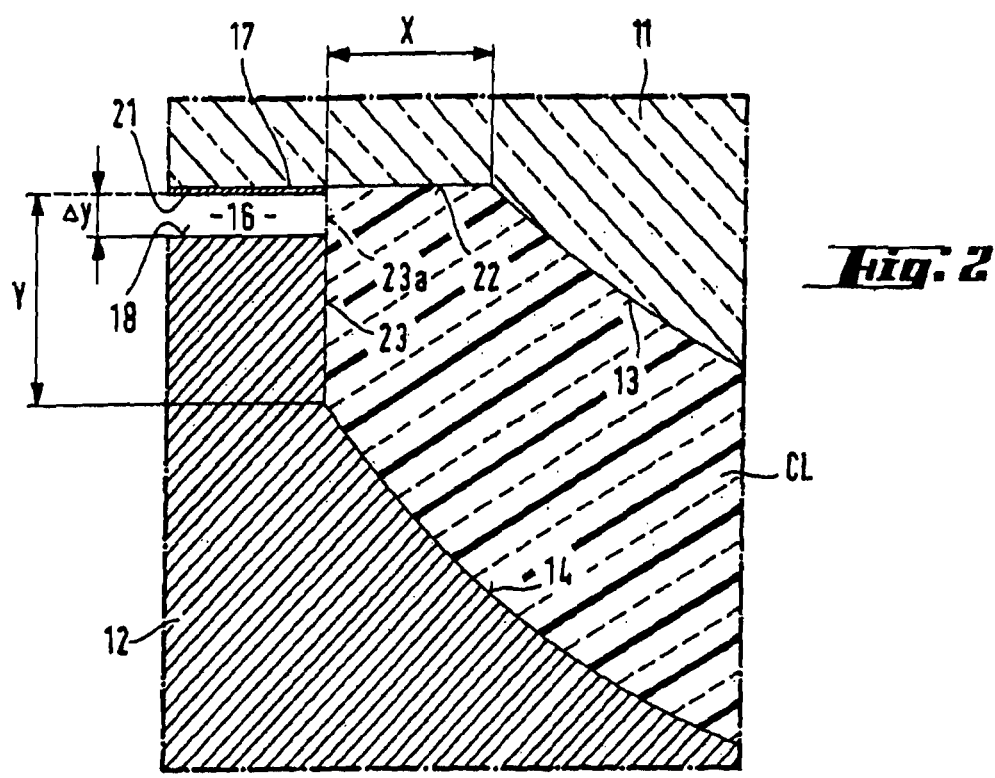

US 10,232,574 B2

REUSABLE LENS MOLDS AND METHODS OF USE THEREOF

This application claims the benefit under 35 USC § 119(e) of U.S. provisional application Ser. No. 62/092,902 filed Dec. 17, 2014, incorporated herein by reference in its entirety.

BACKGROUND

A great effort has been made to develop technologies for cast molding of hydrogel contact lenses with high precision, fidelity and reproducibility and at low cost. One of such manufacturing technologies is the so-called Lightstream Technology™ (Alcon) involving reusable molds and curing a lens-forming composition under a spatial limitation of actinic radiation (U.S. Pat. Nos. 5,508,317, 5,583,163, 5,789,464, 5,849,810, and 8,163,206).The Lightstream Technology™ for making contact lenses have several advantages. For example, reusable quartz/glass molds can be reused, because, following the production of a lens, these molds can be cleaned rapidly and effectively of the uncrosslinked monomer or prepolymer and other residues, using a suitable solvent and can be blown dried with air. Lenses produced according to the Lightstream Technology™ can have high consistency and high fidelity to the original lens design.

However, modern high-volume mass production process for medical devices like contact lenses utilizes re-usable molds in each production cycles. The conventional re-usable contact lens mold consists of a quartz convex base curve and a glass concave front curve. The base curve mold is composed of individually ground and polished quartz, while the front curve mold is composed of high precision press mold and polished glass. The base curve molds must be highly UV transmissive materials such as quartz. In order to ensure consistent lens fabrication, high precision base curve mold shapes are required, and this led to a long lead time in producing a new design for quartz base curve mold because it needs to be individually ground and polished. The long lead-times result in lengthy development cycles and long lead times for mold design and prototyping.

Therefore, there is still a need for new reusable molds for base curve mold that can be produced cost effective and short lead time.

SUMMARY OF THE INVENTION

The invention, in one respect, relates to a reusable mold for making a contact lens, comprising a first mold half having a first mold surface in contact with a lens forming composition and a second mold half having a second mold surface in contact with the lens forming composition, wherein the first mold half and the second mold half are configured to receive each other such that a cavity is formed between the first mold surface and the second mold surface, wherein the cavity defines the shape of a contact lens to be molded, wherein the lens forming composition is polymerizable and/or crosslinkable by an actinic radiation, wherein at least one of the mold halves is a precision press molded mold made from an oxide glass selected from a group consisting of borosilicates glass and fluorophosphates glass.

The invention, in another respect, relates to a method for producing a contact lens, comprising: the steps of:

(1) providing a contact lens mold, wherein the mold comprising a first mold half having a first mold and a second mold half having a second mold surface, wherein the first mold half and the second mold half are configured to receive each other such that a cavity is formed between the first mold surface and the second mold surface, wherein the cavity defines the shape of a contact lens to be molded, wherein at least one of the mold halves is a precision press molded mold made from an oxide glass selected from a group consist of borosilicates glass and fluorophosphates glass, (2) introducing a lens-forming composition into the cavity formed by the first and second molding surfaces, material, wherein the lens-forming material is crosslinkable and/or polymerizable by actinic radiation;

(3) crosslinking/polymerizing the lens-forming material in the mold to form a lens having a polymer matrix;

(4) opening the mold and removing the formed contact lens from the mold.

BRIEF DESCRIPTION OF THE DRAWINGS

FIG. 2 is a detail, indicated by II in FIG. 1, on a greatly enlarged scale.

DETAILED DESCRIPTION OF EMBODIMENTS OF THE INVENTION

Figure 1:
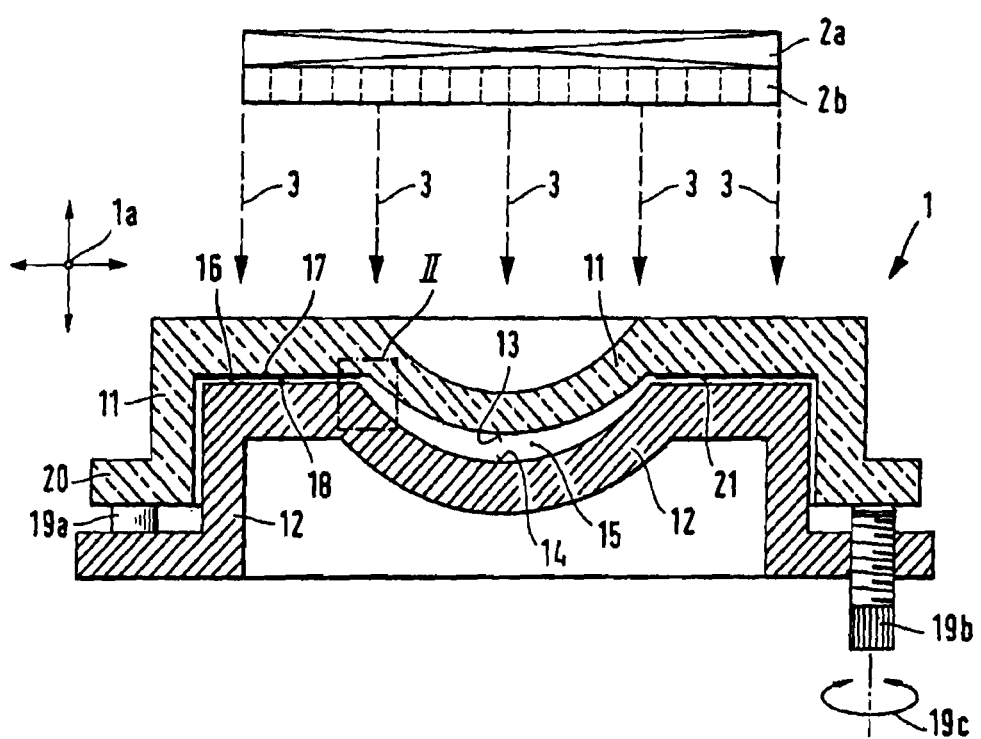
FIG. 1 shows a section through an exemplary embodiment of a casting mold according to the invention in the closed position.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art. As employed throughout the disclosure, the following terms, unless otherwise indicated, shall be understood to have the following meanings "Quartz" refers to the second most abundant mineral in the Earth's continental crust, after feldspar. It is made up of a continuous framework of $SiO_4$ silicon-oxygen tetrahedra, with each oxygen being shared between two tetrahedra, giving an overall formula $SiO_2$.

"Oxide glass" refers to glass comprises oxide selected from the group consisting of Aluminum oxide, Antimony trioxide, Arsenic trioxide, Barium oxide, Bismuth(III) oxide, Boron trioxide, Calcium oxide, Cerium(III) oxide, Chromium(III) oxide, Gadolinium oxide, Germanium oxide, Iron (III) oxide, Lanthanum oxide, Lead(II) oxide, Lithium oxide, Magnesium oxide, Niobium pentoxide, Phosphorus pentoxide, Potassium oxide, Silicon dioxide, Sodium oxide, Strontium oxide, Sulfur dioxide, Tin dioxide, Titanium dioxide, Zinc oxide, Zirconium dioxide and combination therefore.

"Fluorophosphate glass" refers to a class of optical glasses composed of metaphosphates and fluorides of various metals. It is a variant of phosphate glasses.

"Borosilicate glass" refers to a type of glass with the main glass-forming constituents silica and boron trioxide. Borosilicate glass is created by adding boric oxide to the traditional glassmaker's frit of silica sand, soda, and ground lime. Borosilicate glasses are known for having very low coefficients of thermal expansion (~3×10⁻⁶/° C. at 20° C.), making them resistant to thermal shock.

"Precision press molded mold" refers to a mold made by a precision press molding process.

"Precision press molding process" refers to a process is a replicative process that allows the production of high precision optical components from glass without grinding by utilizing a master mold to press glass. The precision press molded optical components may be fine polishing to remove defects. It is used to manufacture precision glass lenses for consumer products such as digital cameras, and high-end products like medical systems. The main advantage over mechanical optical components production by grinding and polishing is that complex optical components geometries such as aspheres can be produced cost-efficiently. In the present invention, Precision press molding process is used to make reusable mold for contact lens manufacturing.

"UV transmissive glass" refers to a glass transparent to a UV radiation, which, for a thickness of 1 mm and the wavelength of 253.7 nm has a transmission of at least 75%, preferably at least 80% and more preferably at least 85%.

"An optical quality surface" refers to a glass surface has a surface roughness less than 30 nm, preferably less than 20 nm, most preferably less than 10 nm.

"About" as used herein means that a number referred to as "about" comprises the recited number plus or minus 1-10% of that recited number.

"Optional" or "optionally" means that the subsequently described event or circumstance can or cannot occur, and that the description includes instances where the event or circumstance occurs and instances where it does not.

An "ophthalmic lens" refers to a contact lens and/or an intraocular lens. A "contact lens" refers to a structure that can be placed on or within a wearer's eye. A contact lens can correct, improve, or alter a user's eyesight, but that need not be the case. A "silicone hydrogel contact lens" refers to a contact lens comprising a silicone hydrogel material.

As used in this application, the term "hydrogel" or "hydrogel material" refers to a crosslinked polymeric material which is not water-soluble and can contains at least 10% by weight of water within its polymer matrix when fully hydrated.

A "silicone hydrogel" refers to a hydrogel containing silicone. A silicone hydrogel typically is obtained by copolymerization of a polymerizable composition comprising at least one silicone-containing vinylic monomer or at least one silicone-containing vinylic macromer or at least one silicone-containing prepolymer having ethylenically unsaturated groups.

A "vinylic monomer" refers to a compound that has one sole ethylenically-unsaturated group.

The term "olefinically unsaturated group" or "ethylenically unsaturated group" is employed herein in a broad sense and is intended to encompass any groups containing at least one >C=C< group.

A "spatial limitation of actinic radiation" refers to an act or process in which energy radiation in the form of rays is directed by, for example, a mask or screen or combinations thereof, to impinge, in a spatially restricted manner, onto an area having a well-defined peripheral boundary. A spatial limitation of UV radiation is obtained by using a mask or screen having a radiation (e.g., UV and/or visible light) permeable region, a radiation (e.g., UV and/or visible light) impermeable region surrounding the radiation-permeable region, and a projection contour which is the boundary between the radiation-impermeable and radiation-permeable regions, as schematically illustrated in the drawings of U.S. Pat. Nos. 6,800,225 (FIGS. 1-11), and 6,627,124 (FIGS. 1-9), 7,384,590 (FIGS. 1-6), and 7,387,759 (FIGS. 1-6), all of which are incorporated by reference in their entireties. The mask or screen allows to spatially projects a beam of radiation (e.g., UV radiation and/or visible radiation) having a cross-sectional profile defined by the projection contour of the mask or screen. The projected beam of radiation (e.g., UV radiation and/or visible radiation) limits radiation impinging on a lens formulation located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV and/or visible beam (i.e., a spatial limitation of radiation). The radiation used for the crosslinking is radiation energy, especially UV radiation (and/or visible radiation), gamma radiation, electron radiation or thermal radiation, the radiation energy preferably being in the form of a substantially parallel beam in order on the one hand to achieve good restriction and on the other hand efficient use of the energy.

A "lens-forming material" refers to a material which can be polymerized and/or crosslinked by actinic radiation to form a contact lens.

Actinic radiation refers to radiation of a suitable form of energy. Examples of actinic radiation includes without limitation light radiation (e.g., UV radiation), gamma radiation, electron radiation, X-ray irradiation, microwave irradiation, thermal radiation and the like.

Further aspects and advantages of the process according to the invention and of the device according to the invention will be seen from the description that follows, in conjunction with the drawings.

The device shown in FIG. 1 is designed for the manufacture of contact lenses from a liquid starting material which may be polymerized or crosslinked by UV radiation. It comprises a mold 1 and an energy source 2a, here a UV light source, as well as means 2b for directing the energy provided by the energy source 2a to the mold in the form of an essentially parallel beam. Of course, the energy source 2a and means 2b can also be combined to form a single unit.

The mold consists of two mold halves 11 and 12, each having a curved mold surface 13 and 14 which together define a mold cavity 15, which in turn determines the shape of the contact lens to be manufactured. The mold surface 13 of the upper mold half 11 in the drawing is convex and determines the rear and base surface of the contact lens with the connected edge area; this mold half is normally called the father mold half. Conversely, the mold surface 14 of the other mold half, which is correspondingly called the mother mold half, is concave and determines the front face of the contact lens to be manufactured, likewise with the connected edge area.

The mold cavity 15 is not completely and tightly closed, but in the embodiment illustrated is open around its peripheral edge which defines the edge of the contact lens to be manufactured, and is linked to a relatively narrow annular gap 16. The annular gap 16 is limited or formed by a flat mold wall 17 and 18 on each of the father mold half 11 and the mother mold half 12. In order to prevent complete closure of the mold, spacers, for example in the form of several bolts 19a or 19b, are provided on the mother mold 12, and these interact with a collar or flange 20 of the father mold 11 and keep the two mold halves at such a distance apart that the said annular gap 16 results. As is indicated symbolically in FIG. 1 by the right-hand spacer bolt 19b with a thread, the spacers may also be of adjustable or spring-action formation. In this way, the two mold halves 11, 12 can be moved towards one another during the crosslinking process to balance out leakage, by adjusting the spacers (indicated symbolically by the arrow 19c showing the direction of rotation) or against a spring action. Of course, the mold can be opened and closed in the usual manner, for example by means of a closure unit which is indicated here only by the arrow symbol 1a. Adjustment of the gap between the two mold halves 11, 12 to balance out leakage, may also be effected e.g. using this external closure unit.

It is also conceivable that, instead of the continuous annular gap 16 and the spacers 19a and 19b, a series of segmentous gaps may be provided, the intermediate areas between the individual segment gaps taking over the function of the spacers. Of course, other configurations of mold halves are also conceivable.

On the mold wall 17 in the area of the annular gap 16, there is a mask 21 which is impermeable to the energy form employed, here this is UV light, (or a mask which at least has poor permeability compared with the permeability of the mold), and this mask extends right to the mold cavity 15, and with the exception of the same, screens all the other parts, hollow spaces or areas of the mold 1 that are in contact with or may come into contact with the liquid, uncrosslinked, possibly excess material, from the radiated energy. Partial areas of the lens edge are therefore formed not by a limitation of the material by mold walls, but by a spatial limitation of the radiation or other forms of energy triggering polymerization or crosslinking.

In the case of UV light, the mask 21 may be preferably a chromium layer, that can be produced by processes known e.g. from photography or UV-lithography. The mask 21 does not necessary have to be fixed; it may also be, for example, removable or exchangeable.

FIG. 2 shows the arrangement of the mold 1 in the transition region between the mold cavity 15 and the annular channel 16 as an enlarged detail. The cavity 15 has here, by way of example, a shape that corresponds to the typical rim geometry of a so-called soft contact lens CL. The cavity rim, and thus the lens rim, is formed here by two wall faces 22 and 23 which are arranged at right angles to one another and are arranged on the male and on the female mold halves 11 and 12 respectively. The width and the height of those two wall faces, and of the rim areas of the contact lens defined by them, are indicated by X and Y respectively. Obviously, the lens rim may in practice also be slightly rounded.

As can be seen clearly, the cylindrical wall face 23 of the female mold half 12 does not extend right up to the fiat wall face 22 and the wall face 17, lying seamlessly adjacent thereto, of the male mold half 11, but is lower by the amount Δy, so that the annular gap 16 already mentioned, between the wall face 17 and the wall face 18 of the two mold halves 11 and 12, is formed or remains open.

The mask 21 provided on the wall face 17 of the male mold half 11 in this example embodiment extends horizontally exactly up to the extension 23a of the wall face. 23 of the female mold half 12. If the UV light, in the form of a parallel beam 3 causing the crosslinking, is incident at right angles to the wall face 22 and 17 and parallel to the cylindrical wall face 23, the space located at right angles below the mask 21 is in shadow and only the material located inside the cavity 15, that is inside the imaginary wall extension 23a, is crosslinked, resulting in a clean and burr-free lens rim which does not require any subsequent mechanical processing. If parallel energy radiation is used, therefore, disregarding the diffraction and scattering effects, which are usually negligible in practice, the contour of the mask 21 is transferred two-dimensionally parallel and (in this case) downwards into the rim area of the contact lens. Therefore, if the two mold halves 11 and 12 are separated from one another by the annular gap 16 of height Δy, the rim is formed towards the outside of the area resulting from that displacement by means of the spatial restriction of the energy radiation.

In general, the invention, in one respect, is directed to a reusable mold for making a contact lens, comprising a first mold half having a first mold surface in contact with a lens forming composition and a second mold half having a second mold surface in contact with the lens forming composition, wherein the first mold half and the second mold half are configured to receive each other such that a cavity is formed between the first mold surface and the second mold surface, wherein the cavity defines the shape of a contact lens to be molded, wherein the lens forming composition is polymerizable and/or crosslinkable by an actinic radiation, wherein at least one of the mold halves is a precision press molded mold made from an oxide glass selected from a group consisting of borosilicates glass and fluorophosphates glass.

Modern high-volume mass production process for medical devices like contact lenses utilizes re-usable molds in each production cycles. A prerequisite that molds could be reusable is that they have equivalent and reproducible clean surface properties in each production cycles. In order to ensure consistent lens fabrication, high precision base curve mold shapes are required, and this led to a long lead time in producing a new design for quartz base curve mold. Typically, six months are needed to produce a new design. Such long lead-times result in lengthy development cycles and long lead times for mold prototyping. Instead, $CaF_2$ (highly UV transmissive crystal) is single point diamond turned to produce optical quality prototyping base curve molds. Unfortunately, $CaF_2$ is prone to thermal shock and easily scratched. Furthermore, $CaF_2$ base curve molds can only be used for lens prototyping purposes not large scale production. The purpose of this invention is to produce cost effective and short lead time high precision UV transmissive glass base curve molds through press molding process. More specifically, the use of press molded base curve molds allows for a significant reduction in mold fabrication time from 6 months (traditionally) to 2 months with a cost reduction of 30%.

The invention is partly based on the discovery that precision press molding process is an excellent alternative to precision grinding and polishing in producing highly UV transmissive base curve contact lens molds. This method allows for us to produce cost effective, and more repeatable and reproducible base curve molds as compared to the traditional way of quartz base curve fabrication. Moreover, the significance of precision press molded base curve glass has potential in more complex lens designs such as the incorporation of non-rotational symmetries, orientation control, and design marks, and this is applicable to any field that takes advantage of precision optics.

According to the present invention, a lens-forming material refers to any material which can be polymerized and/or crosslinked by actinic radiation to form a contact lens. A preferred group of lens-forming materials are prepolymers which are water-soluble and/or meltable. It would be advantageous that a lens-forming material comprises primarily one or more prepolymers which are preferably in a substantially pure form (e.g., purified by ultrafiltration). For example, prefunctionalised PVA (polyvinyl alcohol) polymer used as lens forming material. A more preferred group of lens forming materials is silicone-containing hydrogel. Generally silicone-containing hydrogel comprises at least one components selected from the group consisting of a silicone-containing vinylic monomer, a silicone-containing vinylic macromer, a silicone-containing prepolymer, a hydrophilic vinylic monomer, a hydrophobic vinylic monomer, a crosslinking agent, a free-radical initiator (photoinitiator or thermal initiator), a hydrophilic vinylic macromer/prepolymer, and combinations thereof, as well known to a person skilled in the art.

Precision glass molding is a replicative process that allows the production of high precision optical components from glass with or without grinding and polishing. The process is also known as ultra-precision glass pressing. It is used to manufacture precision glass lenses for consumer products such as digital cameras, and high-end products like medical systems. The main advantage over mechanical lens production is that complex lens geometries such as aspheres can be produced cost-efficiently.

The precision glass molding process consists of six steps:
1. The glass blank is loaded into the lower side of the molding tool.
2. Oxygen is removed from the working area by filling with nitrogen and/or evacuation of the process chamber.
3. The tool system is nearly closed (no contact of the upper mold) and the entire system of mold, die and glass is heated up. Infrared lamps are used for heating in most systems.
4. After reaching the working temperature, which is between the transition temperature and the softening point of the glass, the molds close further and start pressing the glass in a travel-controlled process.
5. When the final thickness of the part has been achieved, the pressing switches over to a force-controlled process.
6. After molding has been completed, the glass is cooled down and the working environment is filled with nitrogen. When the molded part has cooled to the point where it can be handled, it is removed from the tool.
7. The molded part needs a polishing procedure pending on the high precision design. The parts have to polish for achieving the accurate needed design. Precision glass molding process is economical when mass production is required.

According to the present invention, any oxide glass can be used to form a reusable mold, as long as the oxide glass can be precision press molded and have following characteristics: excellent transmission of ultraviolet wavelengths and low Tg properties Common soda lime glass is partially transparent to UVA but is opaque to shorter wavelengths, whereas fused quartz glass, depending on quality, can be transparent even to vacuum UV wavelengths. Ordinary window glass passes about 90% of the light above 350 nm, but blocks over 90% of the light below 300 nm. Good transmission of ultraviolet wavelengths, according to the present invention, refers to any oxide glass transparent to UV radiation, which, for a thickness of 1 mm and the wavelength of 253.7 nm has a transmission of at least 75%, preferably at least 80% and more preferably at least 85%.

During a precision molding process, a polished or fire polished preform is shaped into a final geometry, while conserving its surface quality. The typical temperature range for the molding process is between 500° C. and 700° C., enabling the extension of the operating lifetime of the mold material and a significant time reduction of the press process.

For these glasses, low-temperature softening glasses are required for the employed glass in view of heat resistance of mold tools used in the precision press mold. However, the Tg of quartz typically above 1000° C.

Suitable glasses for the precision press molding process have a glass transformation temperature suitable for and a special glass composition to decrease the tendency for devitrification (the growth of crystalline structures within or on the surface of glass) and to reduce the reaction with mold materials within the molding temperature range.

According to the present invention, the suitable oxide glass for precision press mold has a low-Tg. So-called "low-Tg-glasses" with a maximum transition temperature of less than 600° C. have been developed in order to enable new manufacturing routes for the molds. Mold materials such as steel can be used for molding low-Tg-glasses. The reason is that glasses having a Tg of higher than 600° C. may be inadequate for mold pressing since the temperature required at press shaping may be higher than the heat resistant temperature of the molds in use. In order to be useful for mold pressing, the Tg is preferably no higher than 600° C., more preferably no higher than 580° C., and most preferably no higher than 540° C.

According to the present invention, a preferred group of oxide glass meeting the requirements of UV transmission properties and glass transition temperature comprises borosilicates or fluorophosphates.

Borosilicate glass is a type of glass with the main glass-forming constituents silica and boron trioxide. Borosilicate glasses are known for having very low coefficients of thermal expansion (~3×10–6/° C. at 20° C.), making them resistant to thermal shock. Fluorophosphate glass is a class of optical glasses composed of metaphosphates and fluorides of various metals. It is a variant of phosphate glasses. Highly UV transmissive glasses such as borosilicates Schott 8337B, 8405, 8347, and N-FK5, and fluorophosphates glasses such as Ultran® glasses (Ultran® is a registered trademark of Schott Glass for certain UV-transmitting optical glass types), S-FPL53, S-FPL51, L-PHL1 are commercially available. They can be precision press molded to produce base curve mold for the Lightstream™ platform.

Table 1 lists the composition (formula) of various glasses, whereby the data values are taken from the Material safety data sheet (MSDS) from suppliers: Schott and Ohara.

TABLE 1

| Manufacture Grade | Formula | Schott N-B270 | Schott N-FK5 | Schott 8337B | Schott 8347 | Ohara L-PHL1 | Ohara S-FPL51 | Ohara S-FPL53 |
|---|---|---|---|---|---|---|---|---|
| Lithium Oxide | $Li_2O$ | | | 1 | | 0-2 | | |
| Sodium Oxide | $Na_2O$ | 1-10 | | 2.5 | 3.5 | 2-10 | | |
| Potassium Oxide | $K_2O$ | 1-10 | 10-20 | | | | | 0-2 |
| Magnesium oxide | MgO | | | | | | 2-10 | 2-10 |
| Calcium Oxide | CaO | 1-10 | | 0.5 | | | | |
| Strontium Oxide | SrO | | | | | | 10-20 | 10-20 |

TABLE 1-continued

| Manufacture Grade | Formula | Schott N-B270 | Schott N-FK5 | Schott 8337B | Schott 8347 | Ohara L-PHL1 | Ohara S-FPL51 | Ohara S-FPL53 |
|---|---|---|---|---|---|---|---|---|
| Barium Oxide | BaO | 1-10 | | 1 | | 2-10 | 0-2 | |
| Lanthanum Oxide | $La_2O_3$ | | | | | 0-2 | | |
| Titanium Oxide | $TiO_2$ | <1 | | | | | | |
| Zirconium Oxide | $ZrO_2$ | | | | | | | |
| Niobium pentoxide | $Nb_2O_5$ | | | | | | | |
| Zinc Oxide | ZnO | | | | | 30-40 | | |
| Gadolinium oxide | $Cd_2O_3$ | | | | | | | |
| Boron oxide | $B_2O_3$ | | 10-20 | 20.5 | 13 | 0-2 | | |
| Aluminum oxide | $Al_2O_3$ | | | 5 | 2 | 0-2 | 2-10 | 0-2 |
| Silicon oxide (silica) | $SiO_2$ | 50-60 | 60-70 | 67.5 | 81 | | | |
| Germanium Oxide | $GeO_2$ | | | | | | | |
| Tellurium oxide | $TeO_2$ | | | | | | | |
| Lead oxide | $PbO_2$ | | | | | | | |
| Phosphorous oxide | $P_2O_5$ | | | | | 40-50 | 20-30 | 2-10 |
| Arsenic Trioxide | $As_2O_3$ | | | | | | | |
| Antimony Trioxide | $Sb_2O_3$ | <1 | <1 | | | 0-2 | | |
| Bismuth oxide | $Bi_2O_3$ | | | | | | | |
| Yttrium oxide | $Y_2O_3$ | | | | | | | |
| Sodium fluoride | NaF | | | | | | | |
| Fluorine | F | | 1-10 | | | | | 0-2 |
| Potassium bifluoride | $KHF_2$ | | | | | | | 0-2 |
| Magnesium fluoride | $MgF_2$ | | | | | | 2-10 | 2-10 |
| Calcium fluoride | $CaF_2$ | | | | | | 10-20 | 20-30 |
| Strontium Fluoride | $SrF_2$ | | | | | | 20-30 | 20-30 |
| Barium fluoride | $BaF_2$ | | | | | | 10-20 | 10-20 |
| Yttrium fluoride | $YF_3$ | | | | | | | 2-10 |
| Ammonium fluoride | $NH_4F$—HF | | | | | | | 0-2 |
| Aluminum Fluoride | $AlF_3$ | | | | | | 10-20 | 20-30 |
| Barium fluoride | $BaCl_2$ | | | | | | | |

Table 2 lists the UV transmission properties and glass transition temperature of various glasses, whereby the data values are taken from the Material safety data sheet (MSDS) from suppliers: Schott and Ohara.

TABLE 2

| Manufacture | J-plasma | Schott | Schott | Schott | Schott | Schott | Ohara | Ohara | Ohara |
|---|---|---|---|---|---|---|---|---|---|
| Grade | Quartz, SQ-1 | N-B270 | N-FK5 | 8337B | 8405 | 8347 | L-PHL1 | S-FPL51 | S-FPL53 |
| Glass Transition, ° C. | 1000 | 533 | 466 | 440 | 460 | 520 | 347 | 458 | 426 |

The invention, in another respect, relates a method for producing a contact lens, comprising: the steps of:

(1) providing a contact lens mold, wherein the mold comprising a first mold half having a first mold and a second mold half having a second mold surface, wherein the first mold half and the second mold half are configured to receive each other such that a cavity is formed between the first mold surface and the second mold surface, wherein the cavity defines the shape of a contact lens to be molded, wherein at least one of the mold halves is a precision press molded mold made from an oxide glass selected from a group consist of borosilicates glass and fluorophosphates glass, (2) introducing a lens-forming composition into the cavity formed by the first and second molding surfaces, material, wherein the lens-forming material is crosslinkable and/or polymerizable by actinic radiation;

(3) crosslinking/polymerizing the lens-forming material in the mold to form a lens having a polymer matrix;

(4) opening the mold and removing the formed contact lens from the mold.

What we claim is:

1. A reusable mold for making a contact lens, comprising a first contact lens mold half having a first mold surface in contact with a silicone-containing lens forming composition and a second mold half having a second contact lens mold surface in contact with the silicone-containing lens forming composition, wherein the first contact lens mold half and the second contact lens mold half are configured to receive each other such that a cavity is formed between the first contact lens mold surface and the second contact lens mold surface, wherein the cavity defines the shape of a contact lens to be molded, wherein the silicone-containing lens forming composition is polymerizable and/or crosslinkable by an actinic radiation, wherein at least one of the contact lens mold halves is a precision press molded mold made from a fluorophosphates glass.

2. The reusable mold for making a contact lens according to claim 1, wherein the fluorophosphates glass has a glass transition temperature no higher than 600° C.

3. The reusable mold for making a contact lens according to claim 2, wherein the fluorophosphates glass has a glass transition temperature no higher than 580° C.

4. The reusable mold for making a contact lens according to claim 2, wherein the fluorophosphates glass has a glass transition temperature no higher than 540° C.

5. The reusable mold for making a contact lens according to claim 2, wherein the fluorophosphates glass has a transmission of at least 75% for a thickness 1 mm and a wavelength of 253.7 nm.

6. The reusable mold for making a contact lens according to claim 2, wherein the fluorophosphates glass has a transmission of at least 80% for a thickness 1 mm and a wavelength of 253.7 nm.

7. The reusable mold for making a contact lens according to claim 2, wherein the fluorophosphates glass has a transmission of at least 85% for a thickness 1 mm and a wavelength of 253.7 nm.

8. A method for producing a contact lens comprising: the steps of:
(1) providing a contact lens mold, wherein the mold comprising a first contact lens mold half having a first mold and a second contact lens mold half having a second mold surface, wherein the first contact lens mold half and the second contact lens mold half are configured to receive each other such that a cavity is formed between the first mold surface and the second mold surface, wherein the cavity defines the shape of a contact lens to be molded, wherein at least one of the mold halves is a precision press molded mold made from a fluorophosphates glass,
(2) introducing a silicone- containing lens-forming composition into the cavity formed by the first and second molding surfaces, material, wherein the lens-forming material is crosslinkable and/or polymerizable by actinic radiation;
(3) crosslinking/polymerizing the lens-forming material in the mold to form a lens having a polymer matrix;
(4) opening the mold and removing the formed contact lens from the mold.

9. The method for producing a contact lens according to claim 8, wherein the fluorophosphates glass has a glass transition temperature no higher than 600° C.

10. The method for producing a contact lens according to claim 9, wherein the fluorophosphates glass has a glass transition temperature no higher than 580° C.

11. The method for producing a contact lens according to claim 10, wherein the fluorophosphates glass has a glass transition temperature no higher than 540° C.

12. The method for producing a contact lens according to claim 8, wherein the fluorophosphates glass has a transmission of at least 75% for a thickness 1 mm and a wavelength of 253.7 nm.

13. The method for producing a contact lens according to claim 9, wherein the fluorophosphates glass has a transmission of at least 80% for a thickness 1 mm and a wavelength of 253.7 nm.

14. The method for producing a contact lens according to claim 10, wherein the fluorophosphates glass has a transmission of at least 85% for a thickness 1 mm and a wavelength of 253.7 nm.

15. The method for producing a contact lens according to claim 8, wherein the silicone-containing lens-forming composition comprises at least one components selected from the group consisting of a silicone-containing vinylic monomer, a silicone-containing vinylic macromer, a silicone-containing prepolymer, a hydrophilic vinylic monomer, a hydrophobic vinylic monomer, a crosslinking agent, a free-radical initiator (photoinitiator or thermal initiator), a hydrophilic vinylic macromer/prepolymer, and combinations thereof.

* * * * *